L. A. GREENE.
MOTOR DRIVEN AGRICULTURAL MACHINE.
APPLICATION FILED JULY 1, 1919.
1,343,866.
Patented June 15, 1920.
5 SHEETS—SHEET 3.
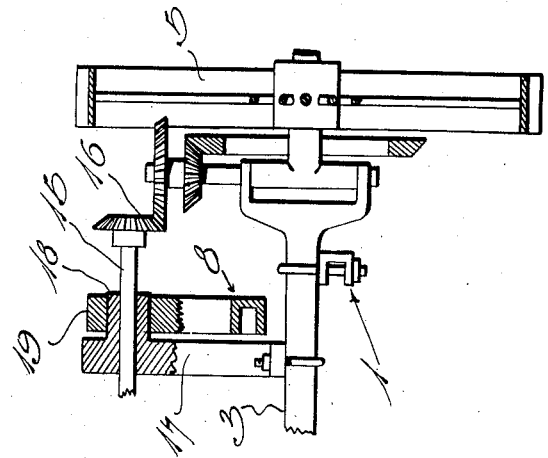
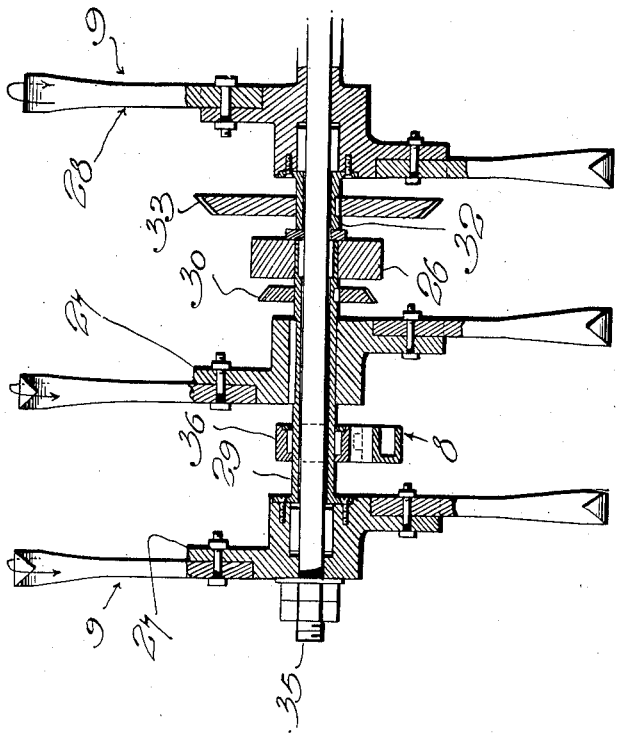
Witness
H. Woodard
Inventor
L. A. Greene
By H. D. Wilson &co
Attorneys

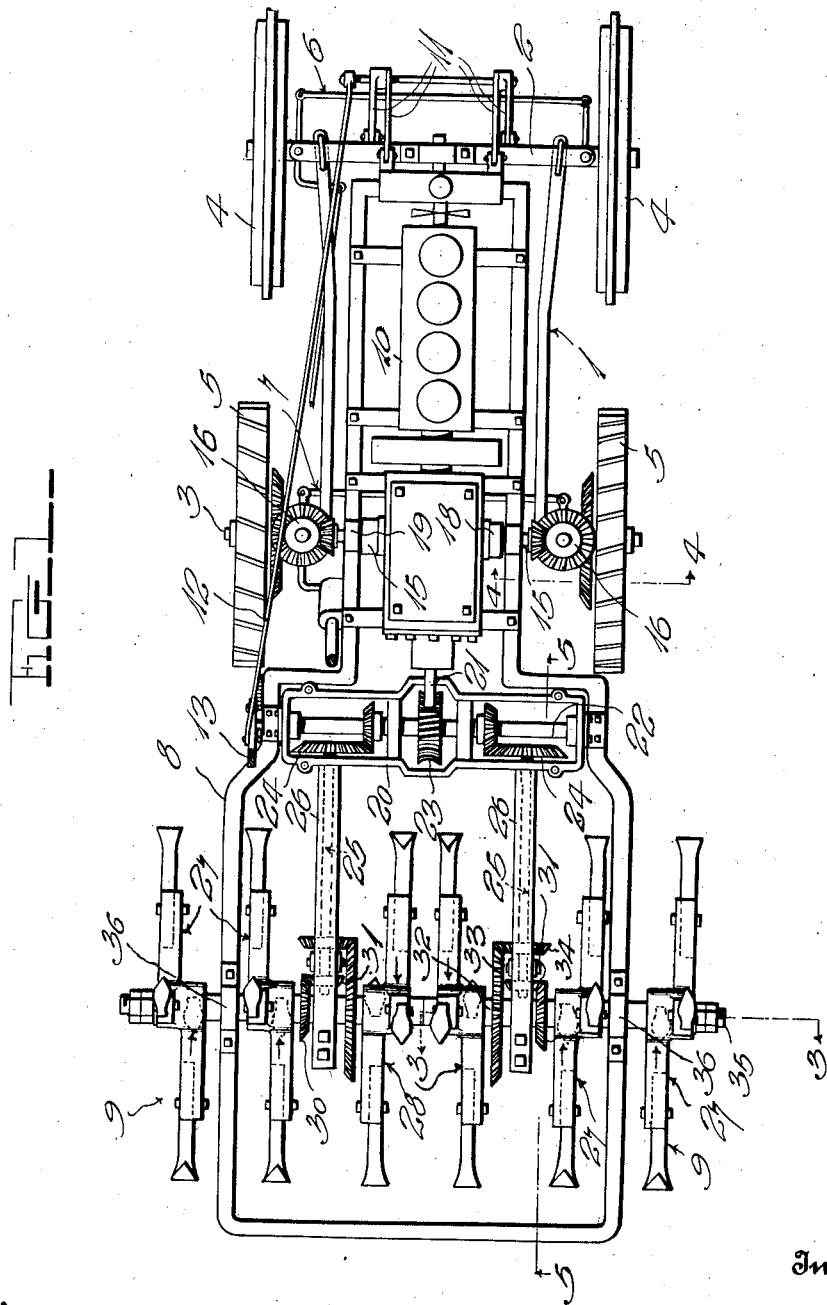

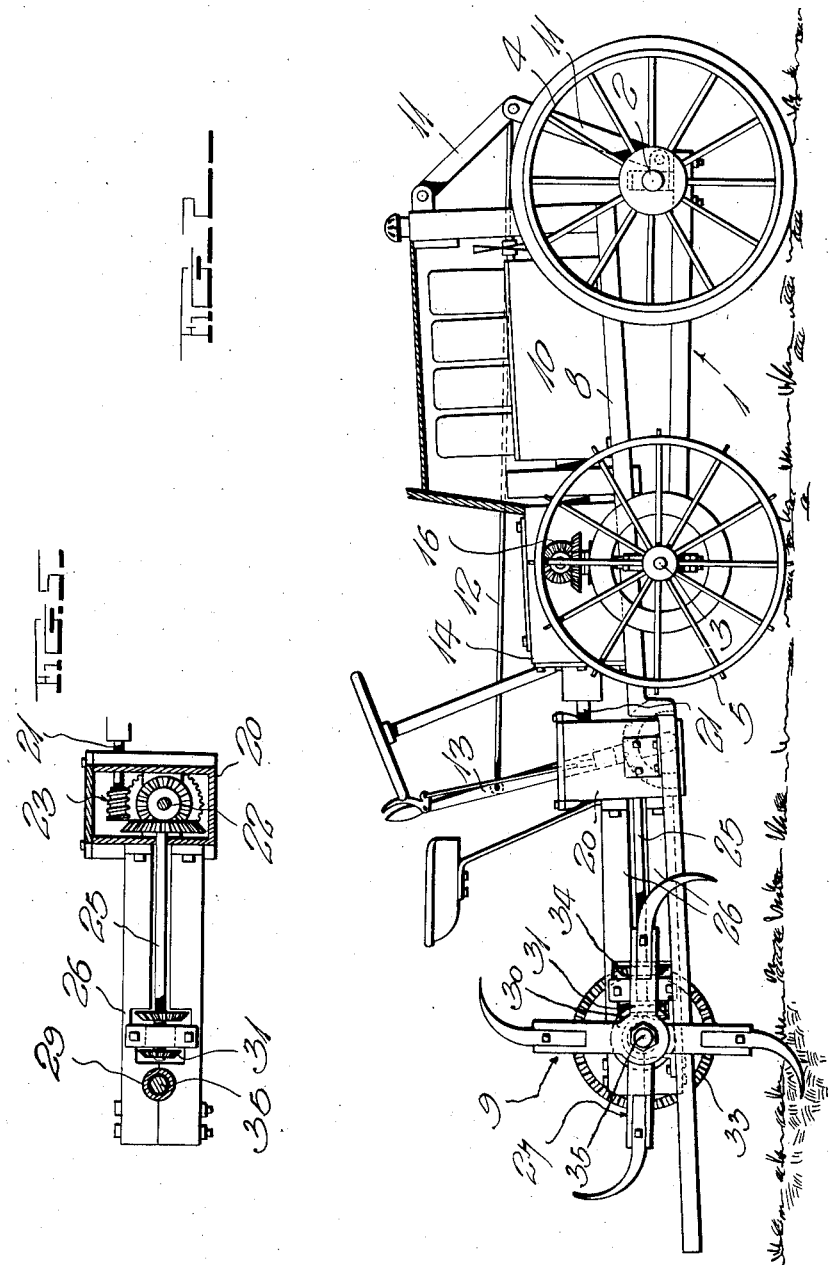

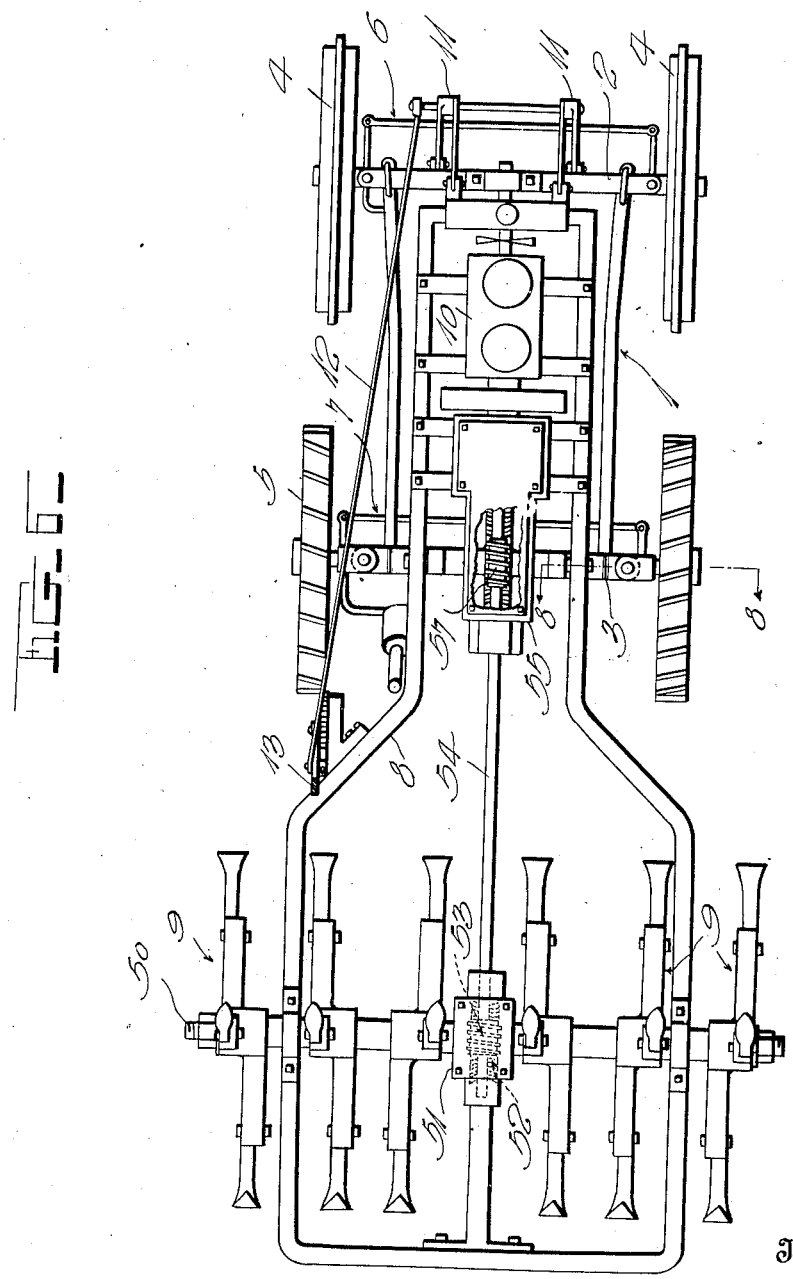

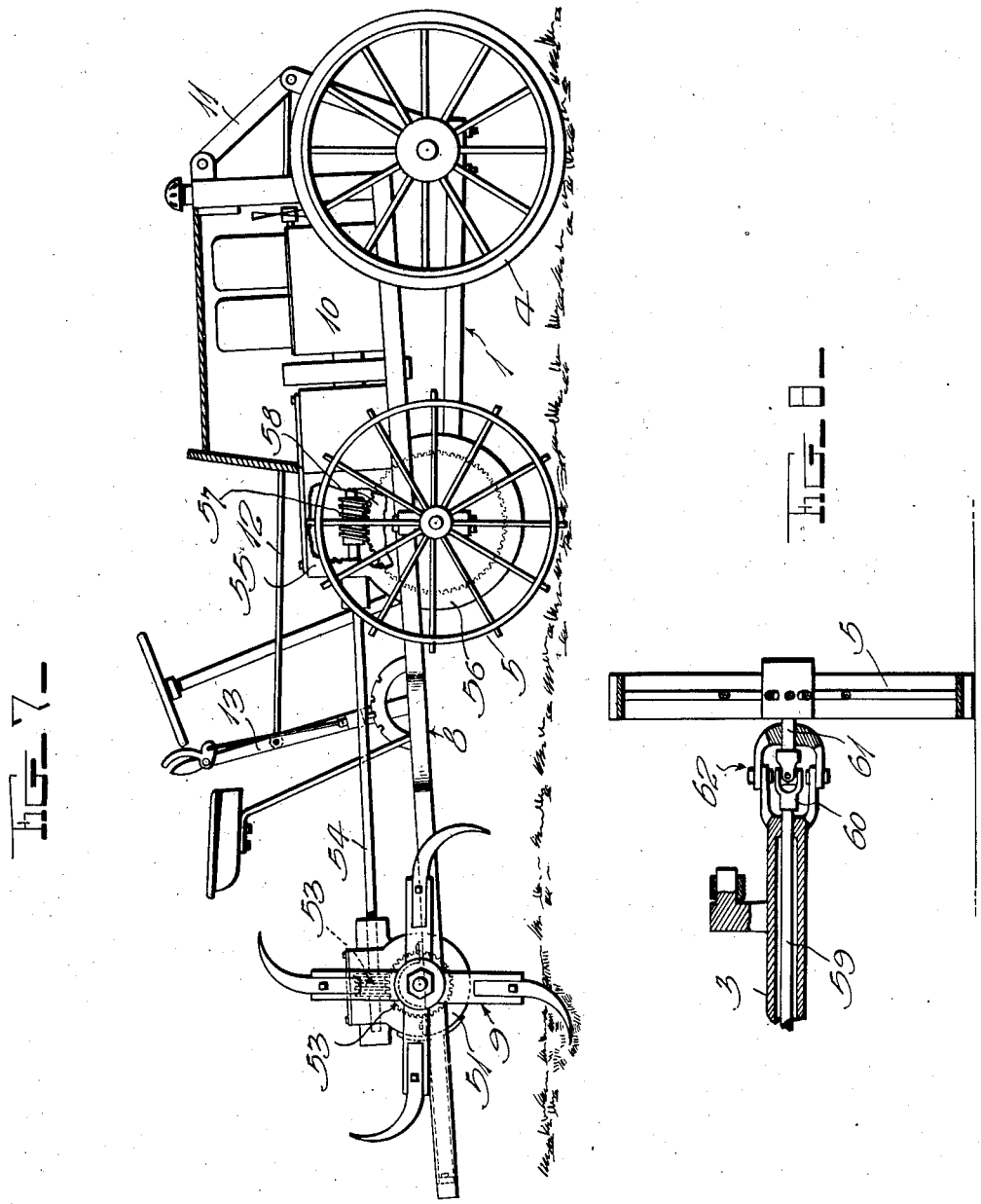

UNITED STATES PATENT OFFICE.

LEMUEL AUSTIN GREENE, OF GREENVILLE, SOUTH CAROLINA.

MOTOR-DRIVEN AGRICULTURAL MACHINE.

1,343,866.     Specification of Letters Patent.     Patented June 15, 1920.

Application filed July 1, 1919. Serial No. 307,943.

*To all whom it may concern:*

Be it known that I, LEMUEL A. GREENE, a citizen of the United States, residing at Greenville, in the county of Greenville and State of South Carolina, have invented certain new and useful Improvements in Motor-Driven Agricultural Machines; and I do declare the following to be a full, clear, and exact description of the invention, such as will enable others skilled in the art to which it appertains to make and use the same.

My invention relates to improvements in the machine disclosed in my pending United States application, Serial No. 186,541, one object being to mount the digging and rotating implements upon a single axis, while a further object is to provide a frame fulcrumed between its ends on the main frame of the machine, to mount the implements on one end of said fulcrumed frame, to carry the motor on the other end of this frame, and to provide means for tilting the frame to vertically adjust the implements. By mounting the implements and motor in this manner, the frame is approximately balanced so that it may be rocked with ease to adjust the implements as required.

With the foregoing in view, the invention resides in the novel construction and arrangement of parts hereinafter fully described and claimed, the descriptive matter being supplemented by the accompanying drawings which form a part of this application.

Figure 1 is a top plan view of the improved machine.

Fig. 2 is a side elevation with parts in section.

Figs. 3 and 4 are vertical transverse sections on the planes of lines 3—3 and 4—4 of Fig. 1.

Fig. 5 is a detail longitudinal section on the plane indicated by the line 5—5 of Fig. 1.

Fig. 6 is a view similar to Fig. 1, showing a different form of construction.

Fig. 7 is a side elevation with parts in section, showing the form of machine illustrated in Fig. 6.

Fig. 8 is a detail transverse section on the plane of line 8—8 of Fig. 6.

In the drawings above briefly described, the numeral 1 designates the main frame of the machine, said frame including front and rear axles 2 and 3 and wheels 4 and 5 carried thereby. Suitable means 6 are provided for steering the front wheels 4 and other means 7 may be used for similarly steering the rear wheels, the latter being mounted for horizontal turning as seen in Fig. 4, and by means yet to be described, said rear wheels may be driven when directed straight ahead or when turned.

Fulcrumed between its ends in any preferred manner, on the frame 1, is a vertically swinging frame 8 upon whose rear end a plurality of implements 9 are carried, while a gasolene motor or the like 10 is mounted on the front end of said frame 8. The implements and the motor substantially balance the frame so that it may be easily moved upon its fulcrum to adjust the implements 9, and although any adequate means could be employed for rocking the frame 8, I preferably employ toggle links 11 connecting the front end of said frame with the frame 1. Thus, by properly operating the toggles, the frame 8 may be tilted as required. I have shown a rod 12 leading rearwardly from the toggles 11 to a hand lever 13 for operating said toggles, but other adequate means could of course be provided.

The construction so far described is common to both forms of the machine shown, but the other features will be separately described. In the construction shown in Figs. 1 to 5, a suitable transmission casing 14 is shown from which the ends of a differentially driven shaft 15 project, said shaft ends being suitably geared at 16 to the rear wheels 5, the arrangement being such as to permit steering of these wheels without affecting the driving thereof. See more particularly Fig. 4. In order that the frame 8 may be tilted without affecting the gearing 16, its fulcrum is preferably alined axially with the shaft ends 15, and as one means of accomplishing this result I have shown posts 17 rising from the rear axle 3 and having journals 18 through which the shaft ends 15 pass, said journals being received in suitable bearings in the upper ends of arms 19 which rise from the frame 8. This detail is also fully illustrated in Fig. 4, but it will be understood that it need not be followed if other adequate means are provided for obtaining the desired result.

In rear of the casing 14 is another gear casing 20, both of these casings being mounted on the frame 8, and a shaft 21 extends rearwardly from said casing 14 into the casing 20 and drives a transverse shaft 22 which is located in the latter, a worm and worm gear 23 being by preference employed for driving said shaft 22 from the shaft 21. By means of suitable gearing 24, the shaft 22 drives a suitable number of rearwardly extending shafts 25 which drive the implements 9, said shafts 25 being held in proper place by any preferred means such as the arms 26 extending rearwardly from the casing 20 to the central shaft of the implements.

The implements 9 are shown as consisting of a plurality of rotary diggers and propellers 27 adapted to be driven in a direction to propel the machine forwardly, and additional rotary diggers 28 which are driven in the opposite direction to exert a braking action for preventing the machine from traveling forwardly at too great a speed, and for at the same time thoroughly pulverizing the earth. All of the diggers 27 and 28 are driven by the shafts 25 and although I have shown four of said diggers 27 and two diggers 28, it will be understood that any suitable number could be used. They are all, however, located on a single transverse axis and although they could be mounted and rotated in any suitable manner, I prefer the construction detailed most clearly in Fig. 3. It will be seen from this figure that the construction at the right-hand side of the machine and the arrangement at the other side is the same. The numeral 29 designates a tubular shaft on which two adjacent diggers and propellers 27 are secured, said shaft having a gear 30 meshing with a gear 31 on the adjacent shaft 25. The members 27 will thus be driven from said shaft in one direction only. Another tubular shaft 32, much shorter than the shaft 29, carries the adjacent digger 28 and is provided with a gear 33 meshing with a gear 34 on the adjacent shaft 25. The several gears intermesh in such manner as to drive the one set of implements forwardly and the other rearwardly, as will be clearly understood from Fig. 1. A main shaft 35 passes through the several tubular shafts to retain them in proper alinement, and suitable bearings 36 are provided for the shafts.

In Figs. 6 to 8, all of the implements 9 rotate in unison with a single shaft 50 which passes through a housing 51 containing a worm gear 52 and a worm 53, the former being rotatable with said shaft 50, while the worm is carried by a longitudinal shaft 54 whose front end enters a transmission casing 55 from which a differential casing 56 depends. Shaft 54 passes entirely through the casing 55 and is driven by the motor 10 through the instrumentality of suitable gearing not shown, and said shaft carries a second worm 57 meshing with a worm gear 58 of a differential mechanism which drives oppositely extending shaft sections 59. The shaft sections 59 pass through the rear axle 3 which is of tubular form for this purpose as seen in Fig. 8, and the outer ends of said shaft sections are connected by universal joints 60 with stub shafts 61 which carry the wheels 5, coacting pivoted forks 62 being provided for holding the parts 59 and 61 in proper relation and for allowing the latter to swing horizontally when the steering means 7 is operated.

It will be observed that the earth working implements 9 are geared to run faster than the carriage wheels 5, so as to assume all propelling force. These carriage wheels come into play in either pushing forwardly or backwardly, so as to coöperate with the amount of force created by the implements. They either retard or aid in moving the machine as may be needed, while the implements are operating either deep or shallow, in either hard or soft soil.

The tractor structure, that is, the wheeled frame and the motor are of extremely light construction and if the only propelling force were exerted by rotation of the wheels 5, such force would not be sufficient to draw an earth working implement which would pulverize the earth for any appreciable depth. However, it is essential that the tractor structure shall be light in order that it will not pack the earth and thereby injure growing plants. To obtain the necessary tractive force and at the same time to work the earth, I have provided the several rotary implements, one set turning forwardly and the other rearwardly. By properly apportioning the number of differently rotating implements and their speeds, the speed with which the machine advances may be readily controlled, and the earth will be effectively worked by the same force which propels the machine.

Since probably the best results are obtainable from the details disclosed, they may well be followed, but within the scope of the invention as claimed, numerous minor changes may well be made.

I claim:—

1. In an agricultural implement, a portable motor-carrying frame, and combined earth working and frame propelling means, consisting of two sets of rotary earth diggers mounted on a common axis on said frame, and means for oppositely driving the two sets of diggers from the motor.

2. In an agricultural implement, a portable motor-carrying frame, axially alined shafts extending transversely of said frame, different numbers of earth diggers carried by said shafts, and means for rotating said shafts oppositely from the motor.

3. In an agricultural implement, a portable motor-carrying frame, a fixed shaft mounted transversely on said frame, tubular shafts rotatable on said fixed shaft and carrying different numbers of earth diggers, and means for oppositely driving said tubular shafts from the motor.

4. In an agricultural implement, a portable motor-carrying frame, axially alined shafts mounted transversely on said frame and carrying different numbers of earth diggers, bevel gears on the adjacent ends of said shafts, a longitudinal shaft driven by the motor, and bevel gears on said longitudinal shaft for oppositely driving the aforesaid bevel gears.

5. In a motor driven agricultural implement, a main portable frame, a supplemental frame fulcrumed between its ends on said main frame, an earth working implement on one end of said supplemental frame, a motor mounted on the other end of said frame for propelling the machine, said earth working implement and said motor approximately balancing said supplemental frame, and means for swinging said frame to adjust said implement.

6. In a motor driven agricultural implement, a main portable frame, a supplemental frame fulcrumed between its ends on said main frame, an earth working implement on one end of said supplemental frame, a motor mounted on the other end of said frame for rotating said implement to propel the machine, said implement and said motor approximately balancing said supplemental frame, and means for swinging said frame to adjust said implement.

In testimony whereof I have hereunto set my hand.

LEMUEL AUSTIN GREENE.